United States Patent
Koreis et al.

Patent Number: 5,481,790
Date of Patent: Jan. 9, 1996

[54] METHOD FOR ALLOWING SELECTIVE ACCESS TO THE INTERIOR OF FLUID CONTAINMENT STRUCTURES

[75] Inventors: Joseph A. Koreis; Monte M. Koreis, both of Bellingham, Wash.

[73] Assignee: Clarus Technologies Corp., Bellingham, Wash.

[21] Appl. No.: 269,534

[22] Filed: Jul. 1, 1994

[51] Int. Cl.⁶ .......................... B65D 45/00; E21B 33/00; F16J 15/00

[52] U.S. Cl. .......................... 29/428; 220/242; 220/327; 220/328; 220/562; 220/565; 220/601; 220/661; 277/1; 277/9; 285/200; 411/542

[58] Field of Search .................... 29/428, 469; 220/242, 220/327, 328, 562, 565, 601, 661; 277/1, 9, 192, 233; 411/371, 542, 915; 285/200, 205, 207, 208

[56] References Cited

U.S. PATENT DOCUMENTS

| | | |
|---|---|---|
| 1,689,575 | 10/1928 | Winn . |
| 2,180,960 | 11/1939 | Kennedy ................................. 285/208 |
| 2,370,799 | 3/1945 | Kelley ..................................... 285/200 |
| 2,486,675 | 11/1949 | Pokras . |
| 2,757,025 | 7/1956 | Noyes et al. . |
| 3,991,913 | 11/1976 | Steffen . |
| 4,075,801 | 2/1978 | Alper et al. . |
| 5,058,519 | 10/1991 | Collins . |
| 5,133,475 | 7/1992 | Sharp . |

FOREIGN PATENT DOCUMENTS 480021  2/1938  United Kingdom ................... 285/208

Primary Examiner—David Scherbel
Assistant Examiner—Randall E. Chin
Attorney, Agent, or Firm—Hughes, Multer & Schacht

[57] ABSTRACT

A system for mounting access plates for covering an access opening onto storage tanks and the like. A backing plate assembly comprising two semi-circular, rigid backing plates is provided. The backing plates are passed individually into the interior of the tank where the backing plate assembly is reconfigured. The backing plate assembly located within the interior of the tank provides a solid structure that can be used to anchor the access plate onto the tank wall over the opening. Interior and exterior gaskets are used to create a fluidtight seal around the opening and to facilitate assembly of the mounting assembly.

7 Claims, 6 Drawing Sheets

5,481,790

METHOD FOR ALLOWING SELECTIVE ACCESS TO THE INTERIOR OF FLUID CONTAINMENT STRUCTURES

TECHNICAL FIELD

The present invention relates to apparatus and methods for accessing the interior of fluid containment structures, and, more particularly, to such apparatus and methods for allowing access plates to be retrofitted onto existing, installed fluid storage tanks.

BACKGROUND OF THE INVENTION

Fluid containment structures such as storage tanks and pipes are used in numerous settings to store and channel fluids such as water and fuel. It is highly desirable, and in some situations imperative, that such containment structures be periodically cleaned to remove impurities that have accumulated on interior surfaces during use. A thorough cleaning of a fluid containment structure often requires access to the interior of the structure so that fluid may be removed from the structure and the interior surfaces of the tank walls cleaned using pressurized fluid.

While the present invention has broad use to any fluid containment structure in which impurities may accumulate, it is of particular importance when used to allow access to fluid storage tanks such as water tanks and fuel tanks. Accordingly, the present invention will be explained in the context of a fluid storage tank, with the understanding that the scope of the present invention is limited by the claims appended hereto and not the following detailed description.

Often, fluid storage tanks are constructed and installed without an opening suitable for allowing the interior surfaces of the tank walls to be cleaned. In such cases, an opening must be created in the tank to allow cleaning, and a plate must be installed onto the tank to prevent loss of fluid when the tank is not being cleaned.

Further, fluid storage tanks are often installed in constricted spaces. For example, in the shipbuilding art, vessels are often built around storage tanks for water and fuel. In such situations, only a portion of the tank may be exposed, and this exposed portion of the tank may immediately adjacent to other immovable objects that render it difficult to work on the exposed portion of the tank.

A number of methods are known for providing access to fluid storage tanks. In one such method, which will be referred to herein as the sheet metal screw method, an access hole is formed in the tank wall and small mounting holes are formed around the access hole. The access plate that covers the access hole is attached to the tank wall using sheet metal screws that engage the mounting holes surrounding the access hole. A gasket is provided to seal the gap between the access plate and the tank wall.

However, the tank walls are often relatively thin and soft, and the screws used to attach the access plate to the tank wall tend to enlarge the mounting holes over time. At some point, the mounting holes no longer effectively engage the screws to hold the access plate on the tank wall. The sheet metal method will eventually fail and is inappropriate for use in many environments.

Another assembly for providing access to the interior of fluid storage tanks is shown at 20 in FIG. 1 and will be referred to herein as the welding method. This assembly comprising a rigid ring 22 welded onto an external surface 24 of a storage tank wall 26 around an access opening 28. An access plate 30 is mounted onto the tank wall 26 over the access opening 28 by an attachment assembly comprising studs 32, flat washers 34, lock washers 36, and nuts 38. The studs are permanently mounted on the rigid ring 22. A ring gasket 40 is arranged between the ring 22 and the access plate 30.

The assembly 20 shown in FIG. 1 is highly reliable. However, the use of welding to attach the rigid ring 22 onto the tank wall 26 significantly increases the costs of providing access to the interior of a storage tank; the owner of the storage tank may not have the equipment or skill to weld the rigid ring 22 onto the tank wall 26.

Further, if the tank formed by the wall 26 is used to store flammable fluids, these fluids must be removed and the tank filled with inert gas prior to welding. This greatly increases the cost and complexity of allowing access to the interior of the tank.

Also, as mentioned above, the wall 26 of the storage tank may be in a place that is inaccessible to welding machinery. If this is the case, the welding method may not be available or only at the great cost of removing either the tank or the structure blocking access thereto.

RELATED ART

The Applicant is aware of the following U.S. Patents that are related to the invention described herein: (a) U.S. Pat. No. 1,689,575 for BOILER FITTING issued to Win on Oct. 30, 1928; (b) U.S. Pat. No. 2,486,675 for SEAL FOR HOT WATER TANKS issued to Pokras on Nov. 1, 1949; (c) U.S. Pat. No. 2,757,025 for TANK FITTING MEANS TO RETAIN ATTACHING BOLTS issued to Noyes et al on Jul. 31, 1956; (d) U.S. Pat. No. 3,991,913 for GRAIN BIN DOOR issued to Steffe on Nov. 16, 1976; (e) U.S. Pat. No. 4,075,801 for STORAGE TANK issued to Alper et al. on Feb. 28, 1978; (f) U.S. Pat. No. 5,133,475 STORAGE TANK WITH INTEGRAL MANWAY issued Sharp on Jul. 28, 1992; and (g) U.S. Pat. No. 5,058,519 issued to Collins.

The Winn patent relates to providing a pipe fitting on an existing storage tank. An opening is formed in the tank such that the opening has a circular central portion with two slots extending in opposite directions from the central portion. An elongate inner clamping plate may be passed lengthwise through the slots and then reoriented within the tank to provide support around the opening. Bolts are then passed through the slots to affix an outer clamping plate to the exterior of the tank. The pipe fitting is formed in the outer clamping plate. The bolts are pulled back through the slots in the tank wall using strings. The Winn patent would be complex to install and is not made for repeated access to the interior of the tank.

The Pokras patent shows an access plate for hot water tanks in which a structural member is formed inside the tank by inserting a sleeve through the opening in the tank from the inside of the tank. The Pokras device assumes that the sleeve can be introduced into the tank through another opening, and, in fact, such an opening may not be available.

The Noyes et al. patent discloses an annular metal ring having an annular rubber member attached thereto. The rubber member is cemented to the tank wall, and an attachment such as a pipe fitting is bolted to the metal ring. This arrangement requires adhesives which may fail when subjected to environmental conditions.

The remaining patents are less relevant and will be discussed only briefly. The Steffen patent discloses a grain bin door that is bolted to the exterior wall of a grain bin. The Alper et al. patent discloses a modular storage tank formed from precast concrete panels. The Sharp patent discloses a fiberglass 1000 gallon storage tank having a manway integrally formed therewith. The Collins patent discloses a temporary patch that is not intended for permanent installation and reuse.

OBJECTS OF THE INVENTION

The foregoing establishes that a general object of the present invention is to provide improved methods and systems for allowing access to the interior of fluid storage tanks and the like.

Another more specific object of the present invention is to provide methods and systems for allowing access to the interior of fluid storage tanks having a favorable mix of the following characteristics:
a. can be installed on tanks that are relatively inaccessible;
b. reliably operates even when used repeatedly to gain access to the interior of the fluid storage tank;
c. may be inexpensively installed; and
d. installable by one of relatively low skill.

SUMMARY OF THE INVENTION

The above and other objects are achieved by an access plate mounting assembly comprising first and second backing plates, interior and exterior gaskets, and a fastening assembly for attaching the backing plates, gaskets, and access plate onto the tank wall to establish a fluidtight seal over an access opening therein. When installed, the backing plates are located within the tank and the access plate is located outside of the tank covering the access opening. The interior gasket seals a gap between the backing plates and the interior surface of the tank wall. The exterior gasket seals a gap between the access plate and the exterior surface of the tank wall.

One important aspect of the present invention is the fact that two backing plates are provided. The backing plates, when installed, together form a backing plate assembly that extends around the periphery of the access opening in the tank wall. When the access opening is circular, these backing plates are semi-circular; the backing plate assembly thus formed by these backing plates is essentially a two-part a ring that is dimensioned to extend around the periphery of the access opening in a manner that does not inhibit access to the interior of the tank through the access opening.

However, because the backing plate assembly is formed by two separate backing plates, the backing plate assembly can be disassembled to allow it to be inserted through the access opening into the interior of the tank. The two backing plates are then reassembled together within the tank to form the backing plate assembly.

Because the backing plates are rigid, they provide a solid surface against which attachment assemblies such as studs and nuts or bolts and nuts can apply a clamping force to hold the entire mounting assembly on the tank wall. The mounting assembly of the present invention thus does not rely on the strength of the tank wall to hold the access plate on the tank.

Further, the mounting assembly of the present invention does not require any welding to mount the access plate onto the tank wall. To establish a reinforced ring around the access opening, the backing plates are inserted through the access opening and assembled into the backing plate assembly within the tank. This can be easily accomplished by one of relatively low skill and does not require evacuation of fuel from the tank as long as the fluid level is below point at which the opening is to be formed.

The fastening assembly preferably comprises at least one and preferably more bolts or studs mounted on each of the backing plates and a nut for each of the bolts or studs. In this case, a stud hole is formed in the tank wall for each of the bolts or studs, with the stud holes being arranged about the periphery of the access opening. The bolts or studs are passed through the appropriate stud holes and similar holes formed in the access plate and are received by the nuts corresponding thereto. Tightening the nuts binds the backing plates and the access plates onto the tank wall; removing the nuts allows the access plate to be removed from the tank wall.

With a fastening assembly comprising bolts or studs, holes corresponding to each of the bolts or studs are formed in the interior and exterior gaskets. Further, these gasket holes are slightly undersized relative to the shaft of the bolts or studs. With this arrangement, the gaskets not only function as seals when the mounting assembly attaches the access plate over the access opening, but also function as mechanical connectors that: (a) maintain the backing plates in the appropriate relationship to each other when the mounting plate assembly is inserted through the access opening and the bolts or studs passed through the stud holes; and (b) maintain the mounting assembly on the tank wall when the nuts are removed from the bolts or studs when the access plate is removed to provide access to the interior of the tank.

In particular, when originally installing the access plate assembly, the bolts or studs are passed through the gasket holes of the interior gasket to form an interior assembly comprising the first and second backing plates and the interior gasket. The slightly undersized gasket holes create friction that prevents the bolts or studs from being inadvertently removed therefrom. The interior assembly may thus be manipulated to a certain extent without the individual components thereof coming apart.

Further, because the gaskets are flexible, the interior assembly can be bent into a distorted configuration that may easily be inserted through the access opening. Once the interior assembly is within the tank, it is returned to, or simply allowed to return to, its original configuration; in this original configuration, the bolts or studs are arranged in the pattern required to pass these bolts or studs through the stud holes formed in the tank wall. The interior gasket thus facilitates installation of the mounting assembly.

Once the interior assembly is placed within the tank and the bolts or studs passed back through the stud holes, the exterior gasket is arranged such that the gasket holes therein receive the bolts or studs. Again, the slightly undersized gasket holes create friction that inhibits withdrawal of the bolts or studs therefrom; because the bolts or studs cannot easily be withdrawn from gasket holes, the bolts or studs cannot easily pass back! through the stud holes. The exterior gasket thus maintains the interior assembly on the tank wall even before the nuts are mated with the bolts or studs and when these nuts are removed to allow the access plate to be removed. Once the access plate is removed, the nuts may be replaced to ensure that the interior assembly is not dislodged during cleaning.

These and other features of the present invention will become clear from the following detailed discussion of the invention.

DETAILED DESCRIPTION OF THE INVENTION

Figure 1:
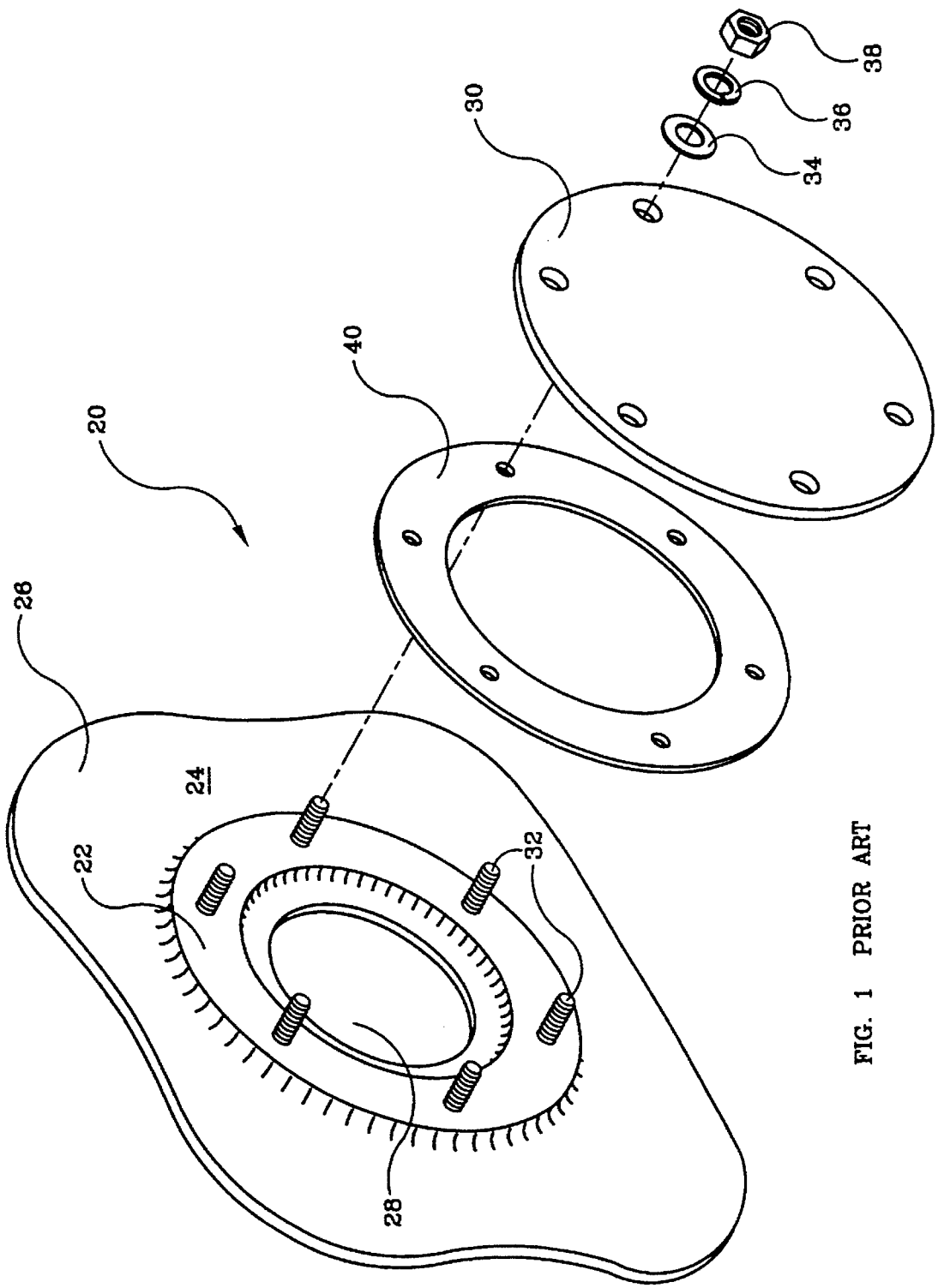
FIG. 1 is an exploded view of a prior art access plate mounting assembly.
Figure 2:
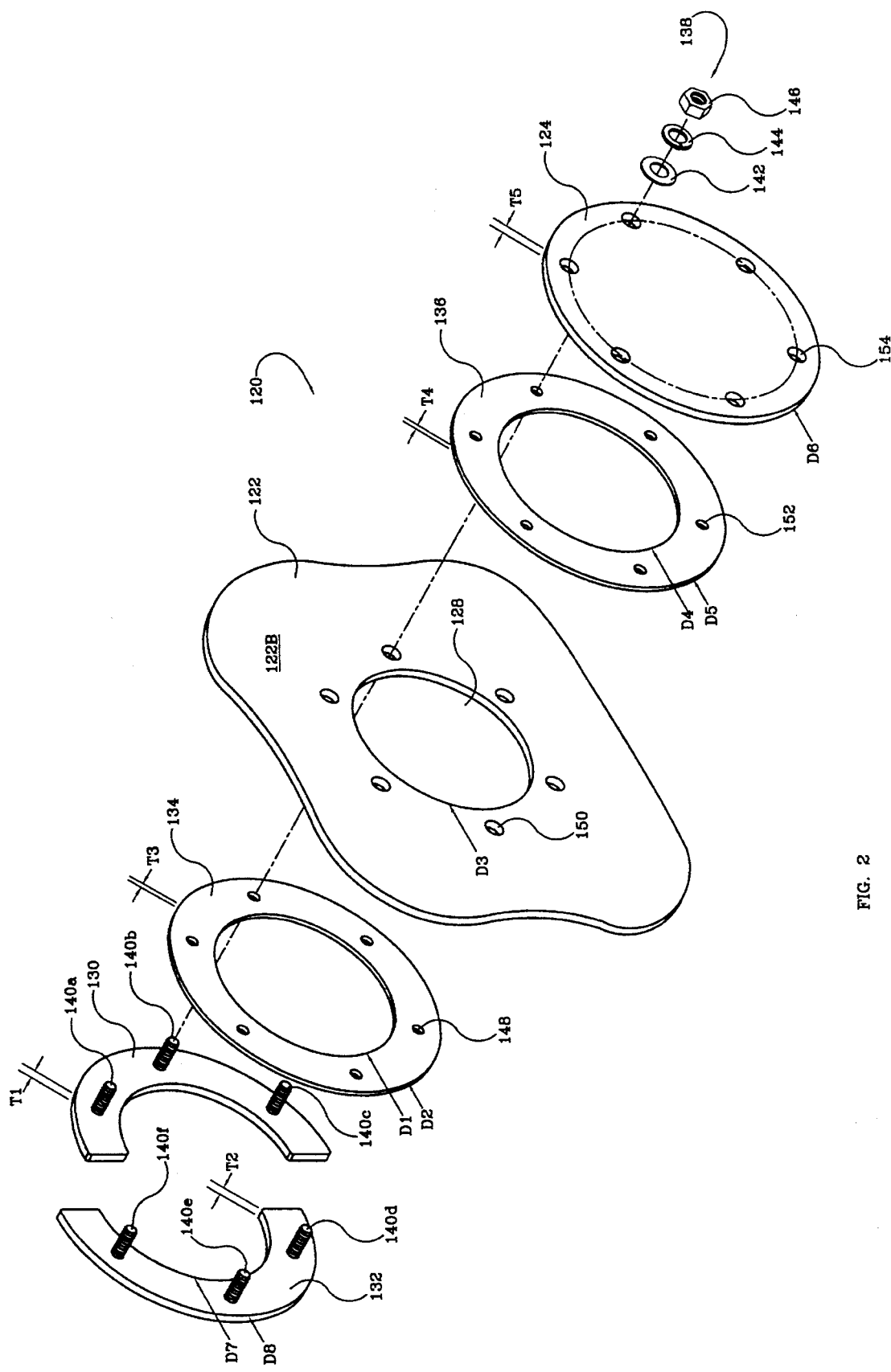
FIG. 2 is an exploded view of an access plate mounting assembly constructed in accordance with the present invention.

Referring now to FIG. 2 of the drawing, depicted at 120 therein is an access plate mounting assembly constructed in accordance with, and embodying, the principles of the present invention. As perhaps best shown in FIG. 3, this mounting assembly 120 mounts on a wall 122 an access plate 124. The wall 122 forms part of a storage tank 126 in which an access opening 128 (FIG. 2) is formed.

The mounting assembly 120 basically comprises first and second backing plates 130 and 132, interior and exterior gaskets 134 and 136, and a fastening assembly 138 comprising studs 140a–140f and a flat washer 142, lock washer 144, and nut 146 for each of the studs 140. The studs 140 extend through a first set of gasket holes 148 formed in the interior gasket 134, stud holes 150 formed in the tank wall 122, a second set of gasket holes 152 formed in the exterior gasket 136, and access plate holes 154 formed in the access plate 124.

Figure 3:
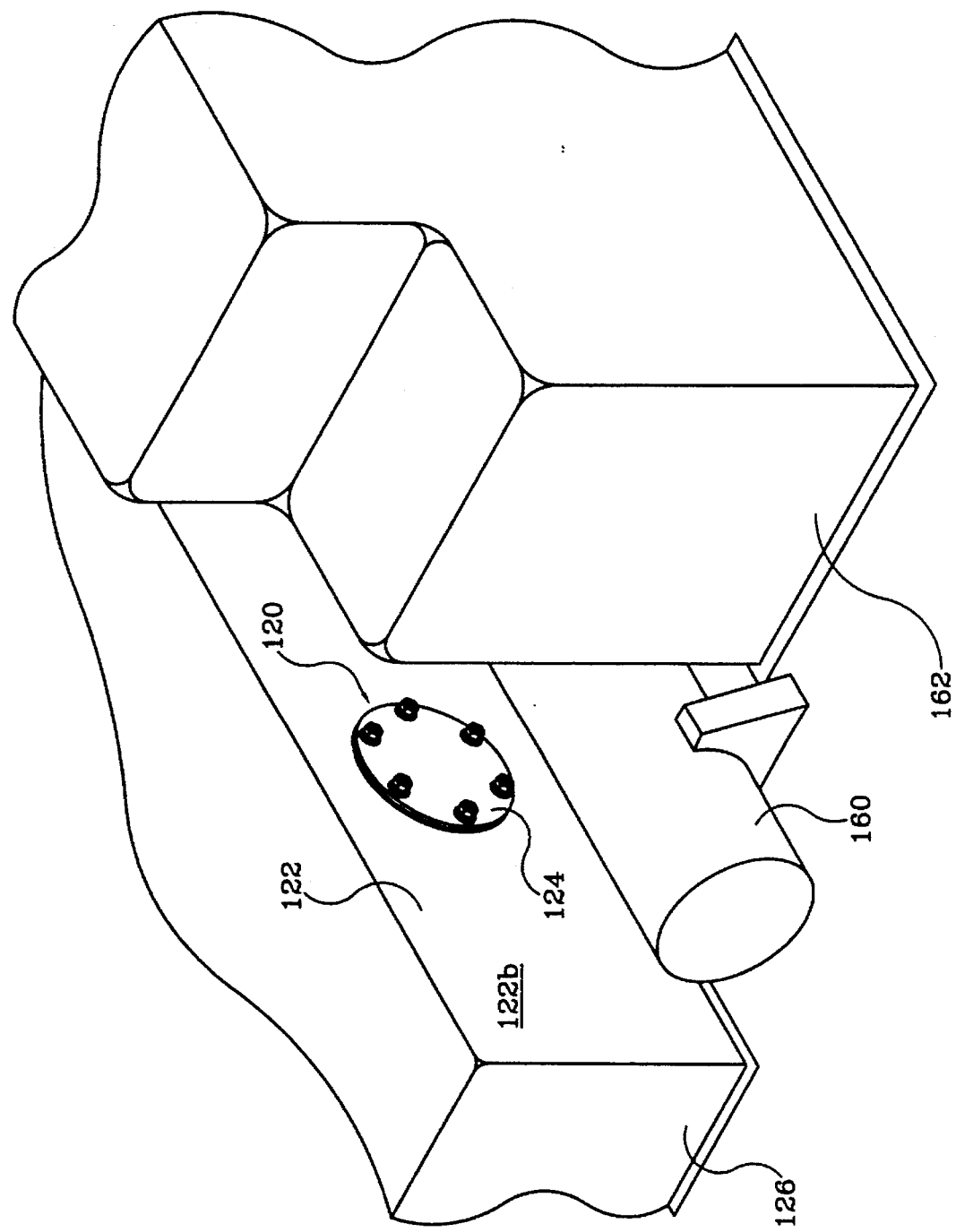
FIG. 3 is a perspective view depicting a typical environment in which the mounting assembly depicted in FIG. 2 will be installed.
Figure 4:
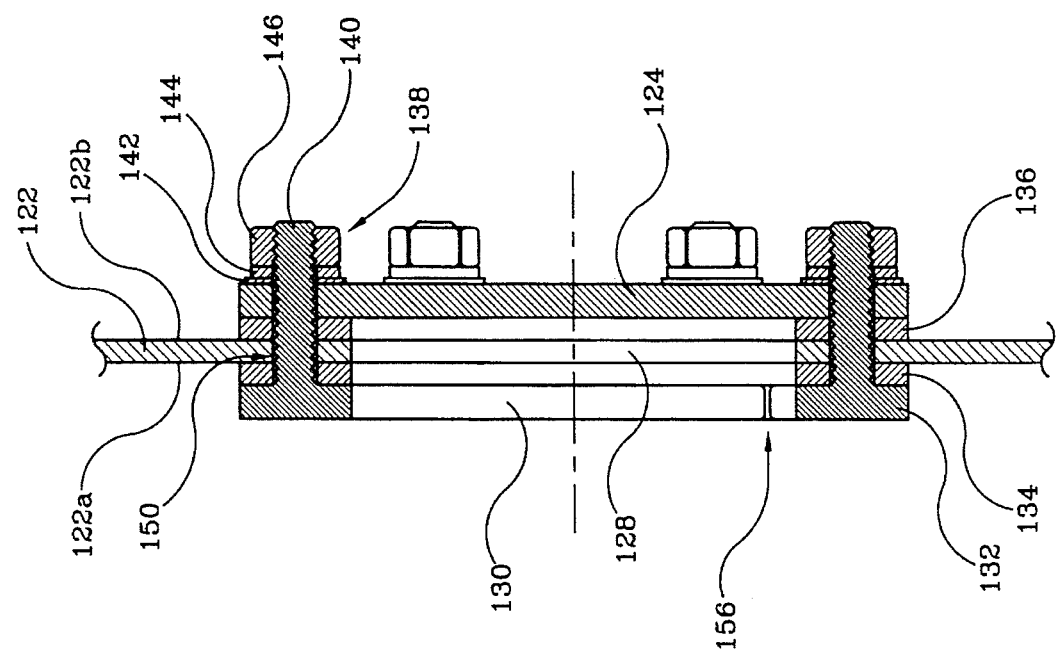

As shown in FIG. 4, when the access plate 124 is mounted onto the tank wall 122, the interior gasket 134 is arranged between a backing plate assembly 156 formed by the backing plates 130 and 132 and an interior surface 122a of the tank wall 122. With reference to FIGS. 3 and 4, the interior gasket 134 prevents fluid from leaking to the exterior of the tank 126 through the stud holes 150 around the studs 140. The exterior gasket 136 is arranged between an exterior surface 122b of the tank wall 122 and the access plate 124 to prevent fluid from leaking to the exterior of the tank 126 through the access opening 128. Thus, when the access plate 124 is mounted on the tank wall 122 as described above, the mounting system 120 forms a fluidtight seal that prevents the leakage of fluid from the tank 126 around the access opening 128.

Further, the backing plates 130 and 132 are rigid and provide a solid structure to which the access plate 124 may be attached. Because the tank wall 122 is gripped between the backing plates 130 and 132 and the access plate 124, the tank wall 122 itself need not bear the loads created by the access plate and/or the fastening system used to attach the access plate to the tank wall.

As will be described in detail below, the provision of separate backing plates 130 and 132 allows these backing plates 130 and 132 to be passed through the access opening 128 and then combined to create a backing plate assembly 156 inside the tank 126. The studs 140 extend through the stud holes 150 in the tank wall. 122 and the access plate holes 154 in the access plate 124. This provides a rigidifying structure without the need to weld a rigid member onto the front of the tank and the problems associated with such welding.

Further, the use of separate backing plates 130 and 132 allows the mounting assembly 120 to be used to install the access plate 124 on a tank wall that is not very accessible.

For example, in FIG. 3 the tank wall 122 is depicted as being immediately adjacent to a pipe 160 and an engine compartment 162. The pipe 160 and engine compartment 162 are spaced a short distance from the tank wall 122, making it difficult for the person installing the mounting assembly 120 to work on the tank wall 122 with welding equipment. Further, the pipe 160 and engine compartment 162 may carry or contain flammable fluids, and precautions must be taken to ensure that these fluids are not ignited by the welding equipment.

These problems are eliminated by the mounting assembly 120 because: (a) the separate backing plates 130 and 132 may easily be inserted between the tank wall 122 the adjacent structures 160 and 162; and (b) no welding is necessary to mount the access plate 124 onto the tank wall.

Figure 5:
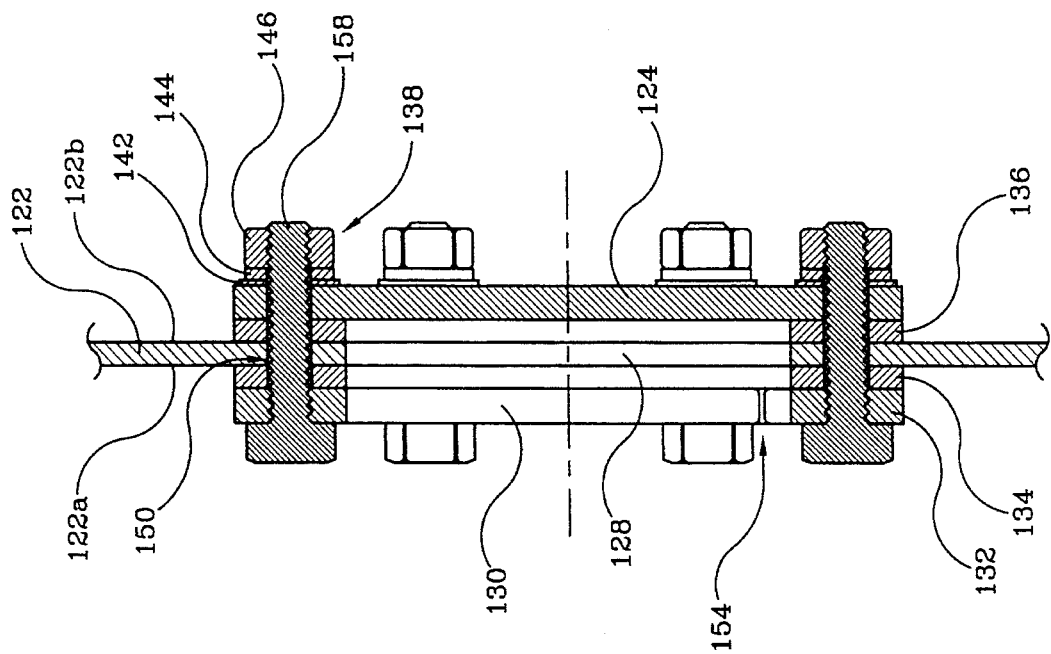
FIGS. 4 and 5 are side, cut-away views showing to common fastening assemblies used by the mounting assembly shown in FIG. 2.

Comparing FIGS. 4 and 5, it can be seen that bolts 158 as shown in FIG. 5 may be used in place of the studs 140. The studs 140 are simply welded at a right angle to the backing plates 130 and 132. If the bolts 158 are used, these bolts 158 should be passed through stud holes formed in the backing plates 130 and 132. Adhesive should be used to bond the bolts 158 to the backing plates 130 and 132 and prevent fluid from leaking to the exterior of the tank 126.

Figure 6C:
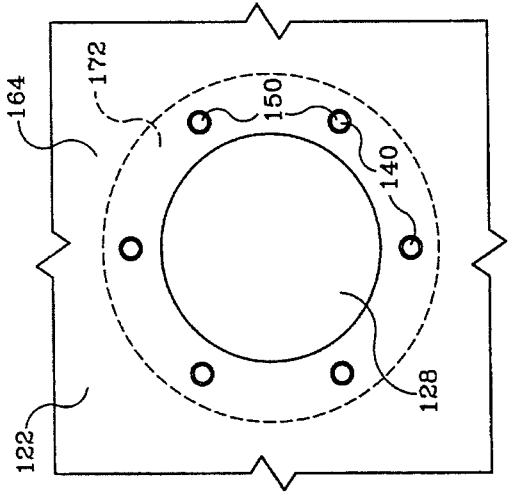
FIGS. 6A–F are front plan views depicting the installation of the mounting assembly of FIG. 2.
Figure 6F:
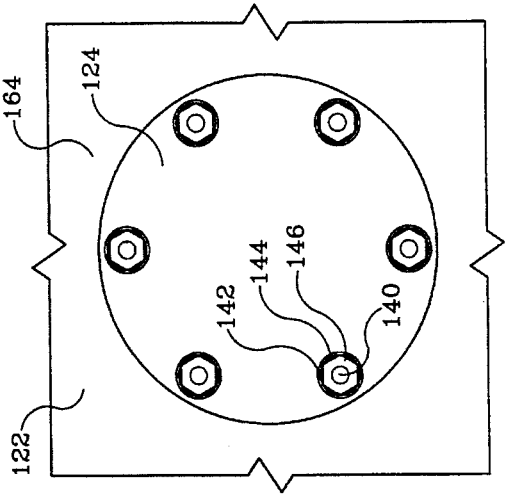
Figure 6B:
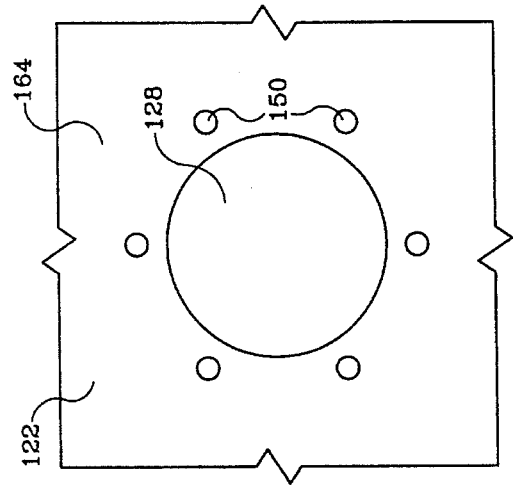
Figure 6E:
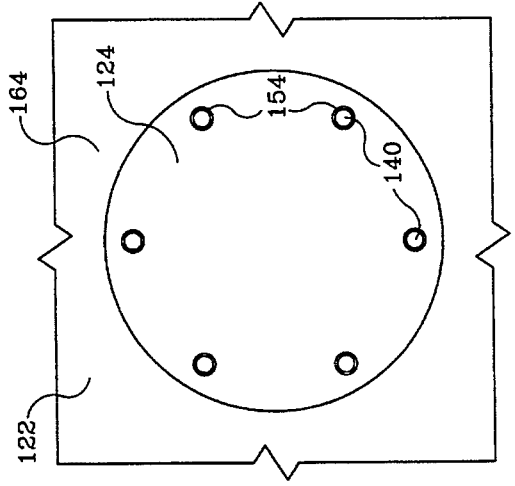
Figure 6A:
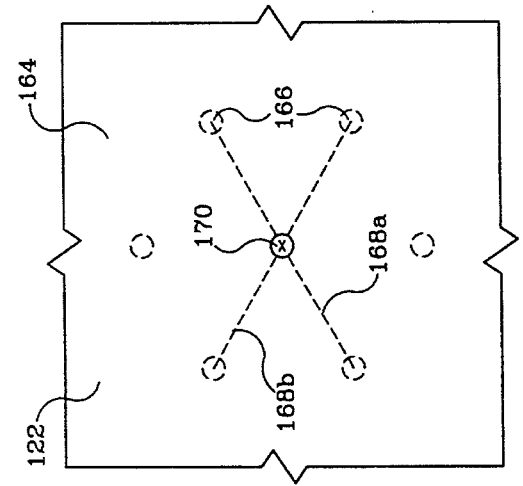
Figure 6D:
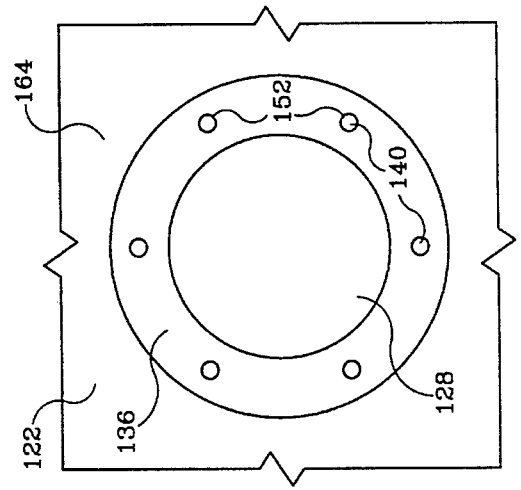
Figure 7C:
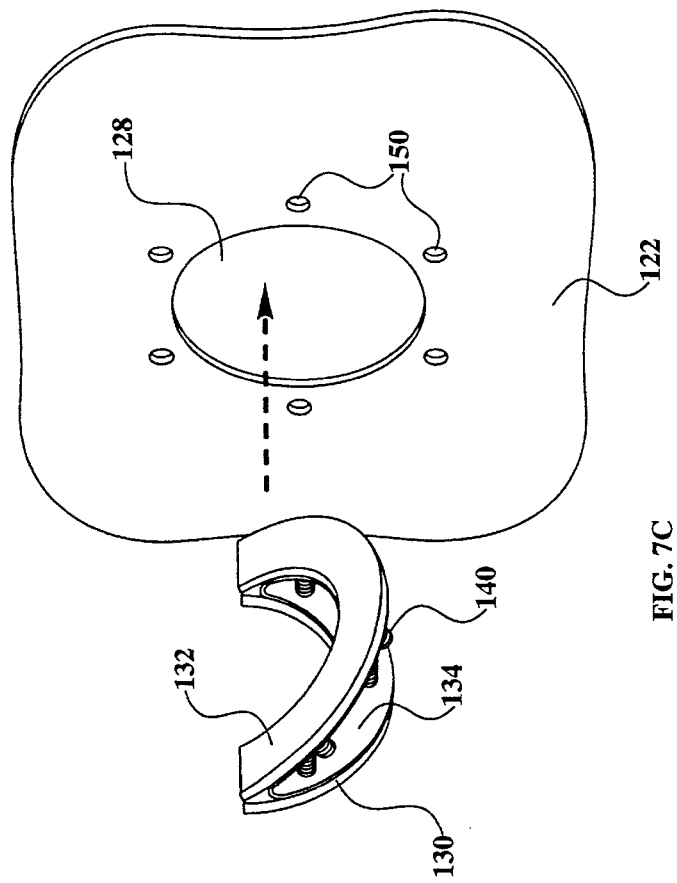
FIG. 7 is a perspective view showing details of the step shown in FIG. 6C.
Figure 7B:
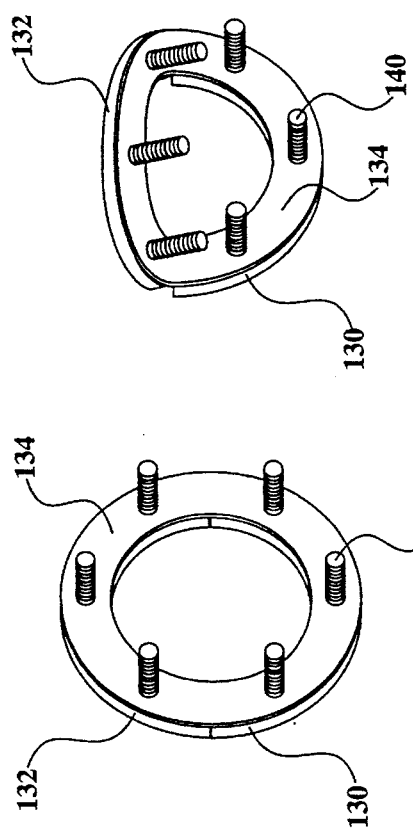
Figure 7A:
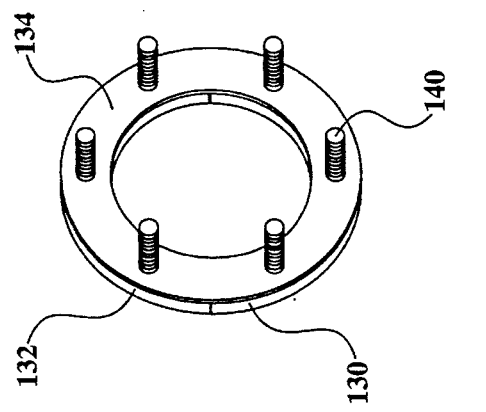

Referring now to FIGS. 6 and 7, the installation of the mounting assembly 120 will be explained. Initially, a desired location 164 on the tank wall 122 is identified. When the exemplary backing plates 130 and 132 and access plate 124 are used, the desired location should be flat and large enough to accommodate the access plate 124. If access is required into the interior of a fluid containment member having a curved surface (such as on a round tank or pipe), the backing plates 130 and 132 should be shaped to accommodate the curved surface.

Once the desired location 164 is identified, the access plate 124 is used as a template for marking stud locations 166 of the the stud holes 150. The stud holes 150 are then formed at each of the stud locations.

Between any two opposing stud locations 166, a centering line such as lines 168a,b in FIG. 6A is drawn; the intersection of these lines 168a,b identifies a center location 170. The access opening 128 is formed about the center location 170; in particular, a pilot hole is first formed at the center location 170, after which a hole saw is used to form the access opening 128 having the desired diameter. With hole configurations that are very large or non-circular, other cutting methods such as reciprocating saw or jig saw may be used to form the access opening 128.

Once the stud holes 150 and the access opening 128 are formed as just described, seven perforations are formed in the tank wall 122 at the desired location 164 as shown in FIG. 6B.

As shown in FIG. 6C, an interior assembly 172 comprising: (a) the backing plates 130 and 132 with the studs 140 projecting therefrom; and (b) the interior gasket 134 is next placed inside the tank 126 through the opening 128 and arranged with the studs 140 extending through the stud holes 150. As described above, the interior gasket 134 is arranged between the first and second backing plates 130 and 132 and the interior surface 122a of the tank wall 122.

The process of inserting the interior assembly 172 is shown in FIG. 7. Initially, it should be noted that the slightly undersized gasket holes 148 in the interior gasket 134 will exert a frictional force on, and to some extent even positively engage, the threads on the studs 140 to inhibit the withdrawal of the studs 140 from the gasket holes 148. This means that the manipulation of the interior assembly 172 described below will not result in the undesired disassembly of the interior assembly 172.

The interior assembly 172 is initially in what will be referred to as its original configuration shown at 172a in FIG. 7. The interior assembly 172 is next contorted through an intermediate configuration 172b into a contorted configuration 172c. In this contorted configuration 172c, the interior gasket 134 acts like a hinge that allows the first and second backing plates to be rotated about an axis towards each other. To avoid tearing the gasket 134, it is preferable to rotate the backing plates 130 and 132 towards each other such that the studs 140a–c on the first backing plate 130 oppose the studs 140d–f on the second backing plate 132.

In the contorted configuration 172c, the interior assembly presents a small profile that allows it to be easily passed through the access opening 128 into the interior of the tank 126.

Once it is within the tank, the interior assembly 172 may be returned to, or simply allowed to return to, its original configuration. If the gasket 134 is resilient, the interior assembly 172 of the backing plates 130 and 132 may simply be released and the other of these plates 130 and 132 held to allow the resiliency of the gasket 134 to return the interior assembly 172 to its original configuration. The interior assembly 172 in its original configuration may then be easily displaced relative to the tank wall 122 such that the studs 140 enter the stud holes 150 as shown in FIG. 6C.

At this point, the exterior gasket 136 is displaced such that the studs 140 enter the gasket holes 152 as shown in FIG. 6D. At this point, the undersized gasket holes 152 in the exterior gasket 136 engage the threads on the studs 140 to prevent the interior assembly 172 from falling back inside the tank.

The access plate 124 is then displaced such that the studs 140 enter the access plate holes 154 as shown in FIG. 6E. Then, as shown in FIG. 6F, the flat washers 142, lock washers 144, and nuts 146 are assembled onto each of the studs 140 and the nuts 146 tightened to secure the access plate 124 over the access opening 128.

When access to the interior of the tank 126 is desired in the future, the nuts 146 may be loosened and the flat washers 142, lock washers 144, and nuts 146 removed. The access plate 124 may then be removed from the tank wall 122 by displacing the access plate such that the studs 140 leave the access plate holes 154. The exterior gasket 136 will prevent the interior assembly 172 from falling into the interior of the tank 122 when the access plate 124 is so removed. To allow the interior of the tank 126 to be accessed without knocking the interior assembly 172 into the tank 126, however, the flat washers 142, lock washers 144, and nuts 146 should be replaced onto the studs 140 and tightened while the interior of the tank 126 is being accessed.

The following table sets forth certain dimensions of the exemplary mounting assembly 120 and also preferred ranges for these dimensions. In particular, referring to FIGS. 2 and 4, thicknesses T1 and T2 of the first and second backing plates 130 and 132, thickness T3, inner diameter D1, and outer diameter D2 of the interior gasket 134, diameter D3 of the access opening 128, thickness T4, inner diameter D4, and outer diameter D5 of the exterior gasket 136, thickness T5 and diameter D6 of the access plate 124, and inner diameter D7 and outer diameter D8 of the backing plate assembly 156 (FIG. 4 only).

TABLE A

| DIMENSION | PREFERRED EMBODIMENT | PREFERRED RANGE |
|---|---|---|
| D1 | 4" | 2–60" |
| D2 | 6" | 4–60" |
| D3 | 4" | 2–60" |
| D4 | 4" | 2–60" |
| D5 | 6" | 4–60"d6 |
| D6 | 6" | 4–60" |
| D7 | 4" | 2–60" |
| D8 | 6" | 4–60" |
| T1 | 3/16" | 1/16–1/2" |
| T2 | 3/16" | 1/16–1/2" |
| T3 | 3/32" | 1/32–1/4" |
| T4 | 3/32" | 1/32–1/4" |
| T5 | 3/16" | 1/16–1/2" |

As shown in FIG. 4 and described in the above table A, diameters D1, D3, D4, and D7 are normally, but not necessarily, equal. Similarly, diameters D2, D5, D6, and D7 are preferably the same.

Table B below provides a description of the material used for each of the components of the mounting assembly 120 as well as a description of the criteria that may be used in selecting an alternative material.

TABLE B

| COMPONENT | PREFERRED EMBODIMENT | DESCRIPTION |
|---|---|---|
| backing plates | 304 stainless steel | sufficiently rigid to distribute forces on studs/bolts evenly against tank interior wall; cannot be corroded by the material within the tank or by electrolysis from the tank itself |
| interior gasket | Buna-N | sufficiently flexible to fold within backing plates during assembly |
| exterior gasket | Buna-N | sufficiently flexible to fold within backing plate during assembly |
| mounting plates | 304 stainless steel | sufficiently rigid to distribute forces on studs/bolts evenly against tank interior wall; cannot be corroded by the material within the tank or by electrolosys from the tank itself |
| flat washers | stainless steel | |
| lock washers | stainless steel | |
| nuts | stainless steel | |

The present invention may be embodied in forms other than described above. For example, the shapes of the access opening need not be round, in which case the shape of the backing plate assembly, gaskets, and access plate will need to conform to the true shape of the access opening. The tank wall may not be flat, in which case the components of the mounting assembly will need to contoured to conform to the exterior of the tank wall. In general, however, the gaskets should extend around the entire periphery of the opening and the backing plates should distribute forces somewhat evenly around the opening.

The fastening assembly 138 described above is simple and the components thereof readily available, but other assemblies such as rivets and clamps may be employed when the circumstances dictate.

The above-described embodiments are therefore to be considered in all respects illustrative and not restrictive, the scope of the invention being indicated by the appended claims rather than the foregoing description. All changes that come within the meaning and scope of the claims are intended to be embraced therein.

I claim:

1. A method of providing selective access to an interior of a fluid containment member, comprising the steps of:
   a. forming an opening in the fluid containment member;
   b. providing first and second rigid backing plates, each having inner perimeter edges;
   c. providing first and second flexible gasket means;
   d. providing an access member;
   e. assembling the first and second rigid backing plates and the first flexible gasket means together into an interior assembly;
   f. then contorting the interior assembly from an original configuration into a contorted configuration;
   g. passing the interior assembly in its contorted configuration through the opening in the fluid containment member;
   h. returning the interior assembly to its original configuration;
   i. assembling the interior assembly and second gasket means onto the fluid containment member such that
      i. the first gasket means is arranged between the first and second backing plates and an interior surface of the fluid containment member,
      ii. the second gasket means is arranged adjacent to an exterior surface of the fluid containment member, and
      iii. inner perimeter edges of the backing plates and gasket means are arranged relative to the opening in the fluid containment member such that the backing plates and gasket means do not prevent access to the interior of the fluid containment member;
   j. when access to the interior of the fluid containment member is not desired, fastening the access member onto the fluid containment member such that
      i. the first gasket means is securely held between the first and second backing plates and the interior surface of the fluid containment member to seal a first gap therebetween,
      ii. the second gasket means is securely held between the exterior surface of the fluid containment member and the access member to seal a second gap therebetween, and
      iii. the access member covers the opening; and
   k. when access to the interior of the fluid containment member is desired, removing the access member from the fluid containment member.

2. A method as recited in claim 1, in which the step of assembling the backing plates and first gasket means into an interior assembly comprises the steps of:
   a. providing at least one first attachment member for each of the first and second backing plates, wherein each first attachment member is configured to transmit loads thereon to the backing plate associated therewith;
   b. forming first gasket holes in the first gasket means corresponding to each of the first attachment members; and
   c. passing the first attachment members through the first gasket holes.

3. A method as recited in claim 2, further comprising the step of slightly undersizing the first gasket holes relative to the first attachment members to inhibit relative movement between the first and second backing plates and the first gasket means.

4. A method as recited in claim 3, further comprising the steps of:
   a. forming second gasket holes in the second gasket means corresponding to each of the first attachment members; and
   b. slightly undersizing the second gasket holes relative to the first attachment members such that the second gasket means maintains the interior assembly on the fluid containment member when the interior assembly and the second gasket means are assembled onto the fluid containment member.

5. A method as recited in claim 2, in which the step of fastening the access member onto the fluid containment member comprises the steps of:
   a. externally threading the first attachment members;
   b. forming mounting holes in the fluid containment member corresponding to each of the first attachment members;
   c. forming second gasket holes in the second gasket means corresponding to each of the first attachment members;
   d. forming access member holes in the access member corresponding to each of the first attachment members;
   e. passing the first attachment members through the mounting holes, the second gasket holes, and the access member holes; and
   f. assembling an internally threaded second attachment member onto each of the first attachment members such that the first and second attachment members create forces that urge the backing plates towards the access member.

6. A method as recited in claim 1, in which:
   a. the step of providing the first and second backing plates comprises the step of forming the first and second backing plates into a shape that, when the first and second backing plates are assembled with the first gasket means to form the interior assembly, the shape generally conforms to a perimeter of the opening formed in the fluid containment member; and
   b. the step of contorting the interior assembly comprises the step of bending the first gasket means such that the first and second backing plates fold towards each other to reduce the overall dimensions of the interior assembly in one dimension.

7. A method as recited in claim 6, in which:
   a. the step of forming the opening in the fluid containment member comprises the step of forming the opening such that it is circular and has an opening diameter;
   b. the step of providing the first and second backing plates comprises the step of forming the backing plates such that they are each semi-circular; and
   c. the step of providing the first gasket means comprises the step of forming the first gasket means such that it is circular, where
      i. an overall shape of the interior assembly in its original configuration is generally circular and has a diameter that is greater than the opening diameter, and
      ii. the interior assembly is generally semi-circular in its contorted configuration and can pass through the opening in the contorted configuration.

* * * * *